(12) United States Patent
Yu et al.

(10) Patent No.: US 11,658,523 B2
(45) Date of Patent: May 23, 2023

(54) CONSEQUENT-POLE PERMANENT-MAGNET-BIASED BEARINGLESS DOUBLE-SALIENT-POLE MOTOR AND CONTROL METHOD THEREOF

(71) Applicants: NANJING UNIVERSITY OF AERONAUTICS AND ASTRONAUTICS, Nanjing (CN); QINHUAI INNOVATION INSTITUTE OF NANJING UNIVERSITY OF AERONAUTICS AND ASTRONAUTICS, Nanjing (CN)

(72) Inventors: Li Yu, Nanjing (CN); Zhuoran Zhang, Nanjing (CN); Yuke Shi, Nanjing (CN); Linnan Sun, Nanjing (CN); Xu Chen, Nanjing (CN)

(73) Assignees: NANJING UNIVERSITY OF AERONAUTICS AND ASTRONAUTICS, Nanjing (CN); QINHUAI INNOVATION INSTITUTE OF NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 212 days.

(21) Appl. No.: 17/281,490

(22) PCT Filed: Nov. 6, 2019

(86) PCT No.: PCT/CN2019/115899
§ 371 (c)(1),
(2) Date: Mar. 30, 2021

(87) PCT Pub. No.: WO2020/125248
PCT Pub. Date: Jun. 25, 2020

(65) Prior Publication Data
US 2021/0408848 A1 Dec. 30, 2021

(30) Foreign Application Priority Data

Dec. 21, 2018 (CN) .......................... 201811570463.6

(51) Int. Cl.
*H02K 1/17* (2006.01)
*H02K 7/09* (2006.01)
(Continued)

(52) U.S. Cl.
CPC ................. *H02K 1/17* (2013.01); *H02K 1/14* (2013.01); *H02K 1/24* (2013.01); *H02K 3/18* (2013.01)

(58) Field of Classification Search
CPC .. H02K 1/14; H02K 1/17; H02K 1/24; H02K 3/18; H02K 3/28; H02K 1/146;
(Continued)

(56) References Cited

U.S. PATENT DOCUMENTS 4,713,570 A * 12/1987 Mastromattei ......... H02K 37/20
310/168
10,236,732 B2 * 3/2019 Sugita .................... H02K 21/44

FOREIGN PATENT DOCUMENTS

CN 103872811 A * 6/2014
CN 106655560 A * 5/2017

OTHER PUBLICATIONS

CN-106655560-A, Sun, all pages (Year: 2017).*
CN-103872811-A, Cheng, all pages (Year: 2014).*

* cited by examiner

*Primary Examiner* — Naishadh N Desai
(74) *Attorney, Agent, or Firm* — CBM Patent Consulting, LLC

(57) ABSTRACT

A consequent-pole permanent magnet biased bearingless doubly-salient motor includes: a core of a stator/rotor, a middle part of a surface, facing an air gap (11), of each stator
(Continued)

pole 1-1 is grooved toward an edge part of the stator pole 1-1 in an anti-clockwise direction, one permanent magnet is attached in each groove, and a surface, facing the air gap (11), of each permanent magnet (3) is the same in polarity; each stator pole 1-1 is wounded with an armature coil, the armature coils are serially connected in sequence to form an armature winding, and the armature winding is respectively connected to an external main circuit; and every three stator poles 1-1 are wound with a suspension coil, and the suspension coils opposite spatially and radially are serially connected to form a suspension winding connected to an external suspension control circuit.

10 Claims, 5 Drawing Sheets

(51) Int. Cl.
*H02K 1/14* (2006.01)
*H02K 1/24* (2006.01)
*H02K 3/18* (2006.01)

(58) Field of Classification Search
CPC .......... H02K 11/21; H02K 21/44; H02K 3/20; H02K 7/09; Y02W 30/91; H02P 25/02
See application file for complete search history.

DSM: Consequent-pole permanent magnet biased bearingless doubly-salient motor

CONSEQUENT-POLE PERMANENT-MAGNET-BIASED BEARINGLESS DOUBLE-SALIENT-POLE MOTOR AND CONTROL METHOD THEREOF

FIELD OF TECHNOLOGY

The present invention relates to the technical field of bearingless motors, and more particularly, to a consequent-pole permanent magnet biased bearingless doubly-salient motor and a control method thereof.

BACKGROUND

As novel motors integrated with the magnetic bearing function and the driving or power generating function, reluctance type bearingless motors have the characteristics of high space utilization, compact structure and the like. The motors control the inter-pole radial electromagnetic force actively by adjusting the suspension current, such that compared with the conventional motors, the high-speed operational reliability of the motors is improved, and the power density and the efficiency are improved. Presently, solutions such as bearingless switched reluctance motors and electromagnetic bearingless doubly-salient motors have been gradually developed.

The bearingless switched reluctance motors are simple and reliable in structure and are applied to the high temperature, high speed and other harsh environments. However, the bearingless switched reluctance motors have the nonlinear coupling problem between the torque and the suspension force. For the suspension control, there is a need to detect the position angle of the rotor, and the suspension current is adjusted according to the angular position of the rotor. The great difficulty in system implementation leads to the high design and use cost.

The electromagnetic bearingless doubly-salient motors are firm and reliable in stator and rotor structures, so it adapts to the high-temperature and high-speed environments. Meanwhile, as the exciting current provides a bias magnetic field for suspension, the bias magnetic field is no longer provided with the utilization of an armature current like the bearingless switched reluctance motors, and thus the suspension control of the electromagnetic bearingless doubly-salient motors is neither affected by the armature current basically, nor in need of detecting the position angle of the rotor. The electromagnetic bearingless doubly-salient motors provide the bias magnetic field with the independent exciting winding, thereby adjusting the suspension current to control the suspension force of the motors.

However, the adjustment of the exciting current changes the bias magnetic field in the motor and then changes the suspension force, which results in interference and coupling for the suspension control to make the suspension control more difficult.

SUMMARY

The embodiments of the present invention provide a consequent-pole permanent magnet biased bearingless doubly-salient motor and a control method thereof. The consequent-pole permanent magnet biased bearingless doubly-salient motor has the stable bias magnetic field, stable and reliable suspension force, and low interference, thereby reducing the difficulty in suspension control.

To achieve the above-mentioned objective, the following technical solutions are used by the embodiments of the present invention.

A consequent-pole permanent magnet biased bearingless doubly-salient motor includes:
a stator core (1), a rotor core (2), a permanent magnet (3), an armature winding (4) and a suspension winding, the suspension winding including: a first suspension winding (5) and a second suspension winding (6), wherein
the rotor core (2) is composed of a rotor pole (2-1), and the rotor core (2) is of a salient pole structure;
a stator of the motor is composed of the stator core (1) and the permanent magnet (3), the stator core (1) is composed of a stator pole (1-1), and the stator core (1) is of a salient pole structure;
for each stator pole (1-1):
a middle part of a surface facing an air gap (11) is grooved toward an edge part of the surface facing the air gap (11) in an anti-clockwise direction;
one permanent magnet (3) is attached in a groove of each stator pole (1-1), and a surface, facing the air gap (11), of each permanent magnet (3) is the same in polarity;
each stator pole (1-1) is wound with an armature coil, the armature coils are serially connected in sequence to form the armature winding (4), and the armature winding (4) is connected to an external main circuit; and
every three sequentially arranged stator poles form a group and are wounded with a set of suspension coil, and each set of suspension coil uses the same winding direction and winding manner.

A control method of a consequent-pole permanent magnet biased bearingless doubly-salient motor includes a suspension control link and a torque control link; and
the suspension control link includes:
detecting, by a radial displacement sensor mounted on an end cover of the motor in an x-axis direction, a radial position of a rotor of the motor to obtain an actual displacement of the rotor in the x-axis direction;
detecting, by a radial displacement sensor mounted on an end cover of the motor in a y-axis direction, a radial position of the rotor of the motor to obtain an actual displacement of the rotor in the y-axis direction, the x axis and the y axis being orthogonal to each other;
respectively detecting, by a current detection unit, a current feedback value of a first suspension winding (5) of the motor and a current feedback value of a second suspension winding (6);
subjecting a difference value between a preset reference displacement of the motor in the x-axis direction and the actual displacement of the rotor in the x-axis direction to an x-axis displacement adjustment link to obtain a current reference value of the first suspension winding (5);
subjecting a difference value between a preset reference displacement of the motor in the y-axis direction and the actual displacement of the rotor in the y-axis direction to a y-axis displacement adjustment link to obtain a current reference value of the second suspension winding (6);
subjecting a difference value between the current reference value of the first suspension winding (5) and the current feedback value of the first suspension winding (5) to a first suspension current adjustment link to obtain a duty ratio signal of a first suspension control circuit;
subjecting a difference value between the current reference value of the second suspension winding (6) and the current feedback value of the second suspension winding (6) to a second suspension current adjustment link to obtain a duty ratio signal of a second suspension control circuit; and adjusting current of each of the first suspension winding (5) and the second suspension winding (6) by adjusting a switch tube duty ratio of each of the first suspension control circuit and the second suspension control circuit.

The torque control link includes: controlling with sinusoidal current, or controlling with square wave current.

According to the consequent-pole permanent magnet biased bearingless doubly-salient motor in the embodiments, the core of the stator/rotor is of the doubly-salient structure, the middle part of the surface, facing the air gap (11), of each stator pole is grooved toward the edge part of the stator pole in the anti-clockwise direction, one permanent magnet is attached in the groove, and the surface, facing the air gap (11), of each permanent magnet is the same in polarity; each stator pole is wound with the armature coil, the armature coils are serially connected in sequence to form the armature winding, and the armature winding is respectively connected to the external main circuit; and every three sequentially arranged stator poles form one group and wounded with one set of suspension coil, each set of suspension coil uses the same winding manner, and the suspension coils opposite spatially and radially are serially connected to form the suspension winding connected to the external suspension control circuit.

Compared with the prior art in which the bias magnetic field in the motor is unstable to change the suspension force to result in interference and coupling problems to the suspension control, each phase of armature winding is configured asymmetrically such that the counter potential is asymmetric to cause the winding loss and heating imbalance and make the insulating property of the motor worse, and the heating of the power elements of the external main circuit connected to the armature winding of the motor is uneven to affect the reliability, the consequent-pole permanent magnet biased bearingless doubly-salient motor provided by the present invention has the stable bias magnetic field, stable and reliable suspension force, and low interference, and each phase of armature winding is distributed evenly, such that each phase of counter potential is symmetric, the heating of the winding is balanced, the heating of the power elements of the external main circuit connected to the armature winding of the motor is balanced, and the current stress is balanced, and thus the motor and the system thereof have the high reliability.

BRIEF DESCRIPTION OF THE DRAWINGS

In order to describe the technical solutions in the embodiments of the present invention more clearly, a simple introduction on the accompanying drawings which are needed in the description of the embodiments is given below. Apparently, the accompanying drawings in the description below are merely some embodiments of the present invention, based on which other drawings may further be obtained by those of ordinary skill in the art without any creative effort.

In the figures: 1—stator core, 1-1 stator pole, 2—rotor core, 2-1 rotor pole, 3—permanent magnet, 4—armature winding, 5—first suspension winding, 6—second suspension winding, 7—permanent magnetic line, 8—suspension magnetic line generated by a suspension current charged to the second suspension winding in a positive direction, 9—first suspension control circuit, 10—second suspension control circuit, and 11—air gap.

DESCRIPTION OF THE EMBODIMENTS

To make those skilled in the art better understand the technical solutions of the present invention, the present invention will be further described below in detail in conjunction with the accompanying drawings and specific embodiments. The embodiments of the present invention will be described below in detail. Examples of the embodiments are illustrated in the accompanying drawings, throughout which the same or similar signs denote the same or similar elements or elements having the same or similar functions. The embodiments described below with reference to the accompanying drawings are exemplary and are only intended to explain the present invention, but should not be construed as limiting the present invention. It may be understood by those skilled in the art that the singular form "a", "an", "one", "said" and "the" used herein may also include the plural form, unless otherwise stated. It should be further understood that the terms "include" and "including" used in the specification of the present invention specify the presence of stated features, integers, steps, operations, elements and/or components, but do not preclude the presence or addition of one or more other features, integers, steps, operations, elements, components, and/or groups thereof. It should be understood that when an element is called as being "connected" or "coupled" to another element, it may be directly connected or coupled to the other element, or an intervening element may also be present therebetween. In addition, the term "connected" or "coupled" used herein may include wireless connection or coupling. As used herein, the term "and/or" includes any unit and all combinations of one or more of the associated listed items. It may be understood by those skilled in the art that unless otherwise defined, all terms (including technical and scientific terms) used herein have the same meaning as commonly understood by those of ordinary skill in the art to which the present invention belongs. It should be further understood that terms, such as those defined in commonly used dictionaries, should be interpreted as having a meaning that is consistent with the meaning in the context of the prior art and will not be interpreted in an idealized or overly formal sense unless expressly so defined herein.

Figure 1:
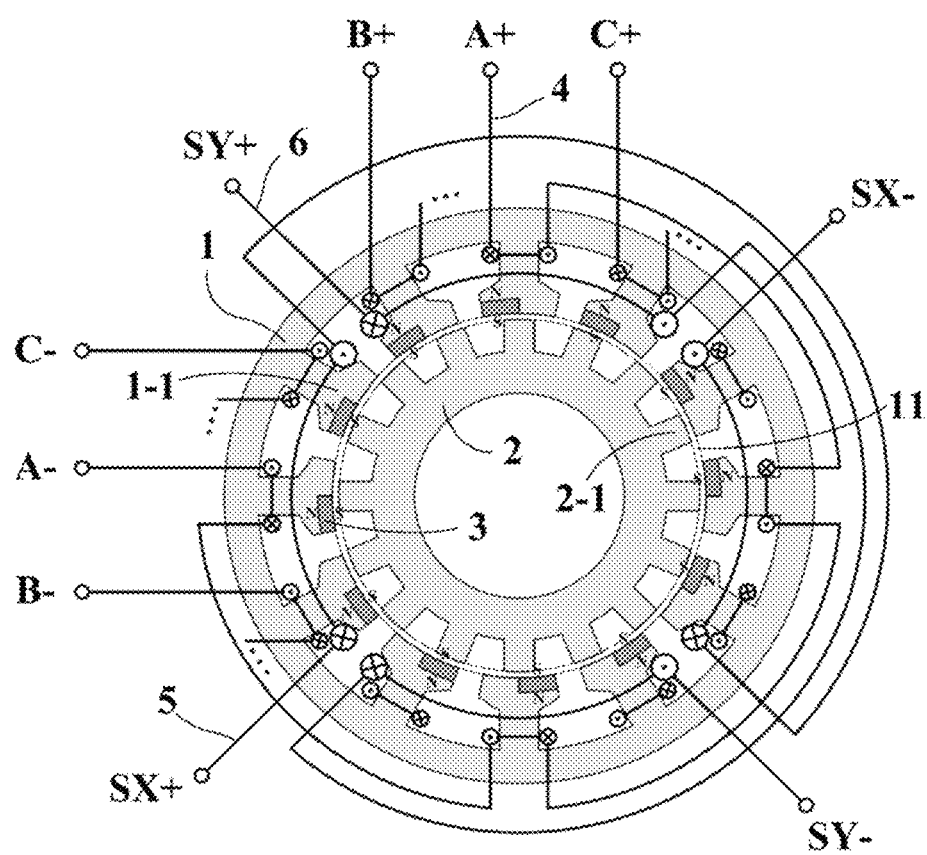
FIG. 1 is a structural schematic diagram of a consequent-pole permanent magnet biased bearingless doubly-salient motor provided by an embodiment of the present invention.

The embodiments of the present invention provide a consequent-pole permanent magnet biased bearingless doubly-salient motor. As shown in FIG. 1, the consequent-pole permanent magnet biased bearingless doubly-salient motor includes:

a stator core (1), a rotor core (2), a permanent magnet (3), an armature winding (4) and a suspension winding, the suspension winding including: a first suspension winding (5) and a second suspension winding (6).

The rotor core (2) is composed of a rotor pole (2-1), and the rotor core (2) is of a salient pole structure.

A stator of the motor is composed of the stator core (1) and the permanent magnet (3), the stator core (1) is composed of a stator pole (1-1), and the stator core (1) is of a salient pole structure.

Figure 6:
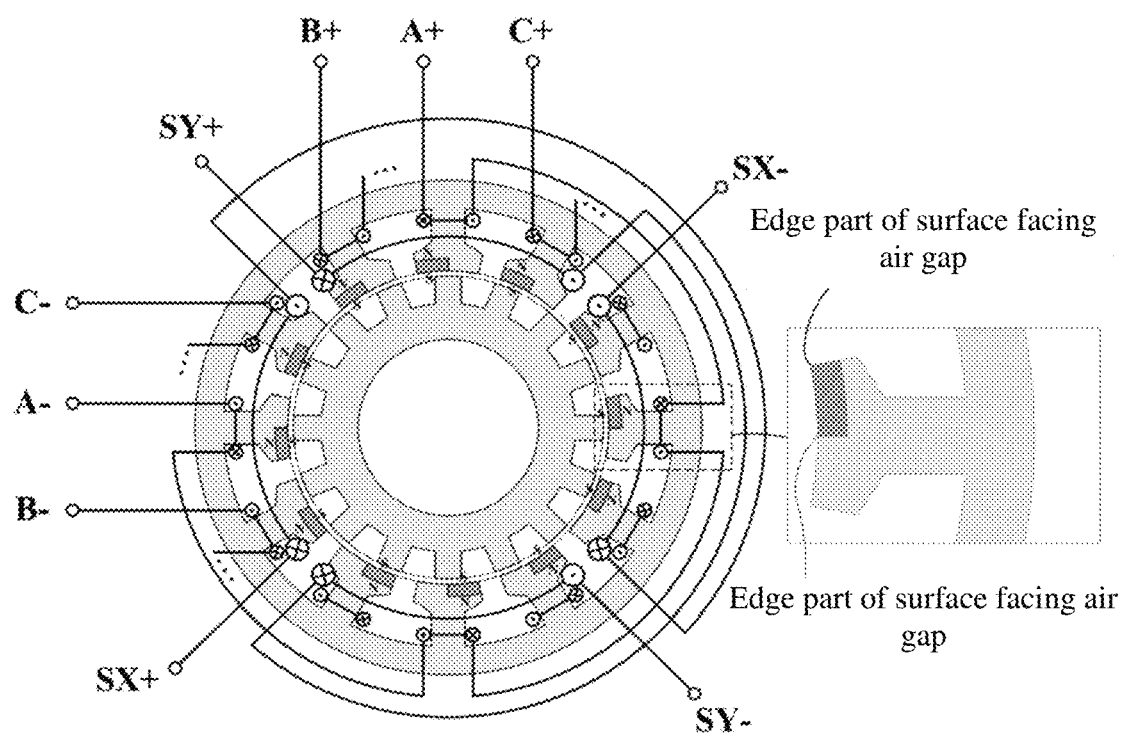
FIG. 6 is a structural schematic diagram of a stator pole of a consequent-pole permanent magnet biased bearingless doubly-salient motor provided by an embodiment of the present invention.

For each stator pole (1-1):

Specifically as shown in FIG. 6, a middle part of a surface facing an air gap (11) is grooved toward an edge part of the surface facing the air gap (11) in an anti-clockwise direction.

One permanent magnet (3) is attached in a groove of each stator pole (1-1), and a surface, facing the air gap (11), of each permanent magnet (3) is the same in polarity.

Each stator pole (1-1) is wound with an armature coil, the armature coils are serially connected in sequence to form the armature winding (4), and the armature winding (4) is connected to an external main circuit.

Every three sequentially arranged stator poles form a group and are wounded with a set of suspension coil, and each set of suspension coil uses the same winding direction and winding manner.

In the prior art, the exciting current of the electromagnetic bearingless doubly-salient motor causes the excitation loss. With the change of the field current, both the bias magnetic field and the suspension force change, which makes the suspension control more difficult. As each phase of armature winding is configured asymmetrically, the counter potential is asymmetric to cause the winding loss and heating imbalance and make the insulating property of the motor worse, and the heating of the power elements of the external main circuit connected to the armature winding of the motor is uneven to affect the reliability. The electromagnetic bearingless doubly-salient motor has a long excitation magnetic path, such that the excitation efficiency is low, and the loss is increased.

According to the consequent-pole permanent magnet biased bearingless doubly-salient motor in the embodiment, the core of the stator/rotor is of the doubly-salient structure, the middle part of the surface, facing the air gap (11), of each stator pole 1-1 is grooved toward the edge part of the stator pole 1-1 in the anti-clockwise direction, one permanent magnet is attached in each groove, and the surface, facing the air gap (11), of each permanent magnet is the same in polarity; each stator pole 1-1 is wound with the armature coil, the armature coils are serially connected in sequence to form the armature winding, and the armature winding is respectively connected to the external main circuit; and every three sequentially arranged stator poles 1-1 are wounded with the suspension coil, and the suspension coils opposite spatially and radially are serially connected to form the suspension winding connected to the external suspension control circuit. The present invention further discloses a control method of the consequent-pole permanent magnet biased bearingless doubly-salient motor. With the use of the stator core consequent-pole permanent magnet for excitation, the usage of the permanent magnet can be reduced, the heating loss can be reduced, and the operation efficiency can be improved. As the suspension flux path has the small reluctance, the suspension adjustment efficiency is high; and as the suspension flux does not pass through the permanent magnet, the demagnetization risk of the permanent magnet is avoided. The consequent-pole permanent magnet biased bearingless doubly-salient motor provided by the present invention greatly optimizes the suspension property and has the firm and reliable rotor structure, and thus is particularly applied to high-speed application occasions such as aerospace electric drive systems.

For the problem that the control is more difficult due to the fact that the exciting current changes for the sake of adjusting the voltage to make both the bias magnetic field and the suspension force change in the existing solutions, the present invention does not change the bias magnetic field because the bias magnetic field is provided by the permanent magnet.

Each stator pole 1-1 is wound with an armature coil, the armature coils are serially connected in sequence to form the armature winding 4, and the armature winding 4 is connected to an external main circuit. The external main circuit is a full-bridge inversion circuit. The expression "the armature coils are serially connected in sequence" may be understood as that the armature coil of one stator pole (1-1) is serially connected to the armature coil of anther stator pole (1-1).

Every three sequentially arranged stator poles form a group and are wounded with a set of suspension coil, and each set of suspension coil uses the same winding direction and winding manner.

Specifically, the number of stator poles (1-1) is 12n, and the number of rotor poles (2-1) is 16n, the n being a positive integer.

Specifically for example: as shown in FIG. 1, the doubly-salient structure using 12/16 poles includes the stator core 1, the rotor core 2, the permanent magnet 3, the armature winding 4, the first suspension winding 5 and the second suspension winding 6; the rotor core 2 includes a plurality of rotor poles 2-1; and the rotor core is of the salient pole structure. The stator is composed of the stator core 1 and the permanent magnet 3; the stator core 1 includes a plurality of stator poles 1-1; the stator core 1 is of the salient pole structure; the middle part of the surface, facing the air gap (11), of each stator pole 1-1 is grooved toward the edge part of the surface, facing the air gap (11), of the stator pole 1-1 in the anti-clockwise direction; one permanent magnet 3 is attached in the groove; and the surface, facing the air gap, of each permanent magnet 3 is the same in polarity and is the S pole.

Figure 5:
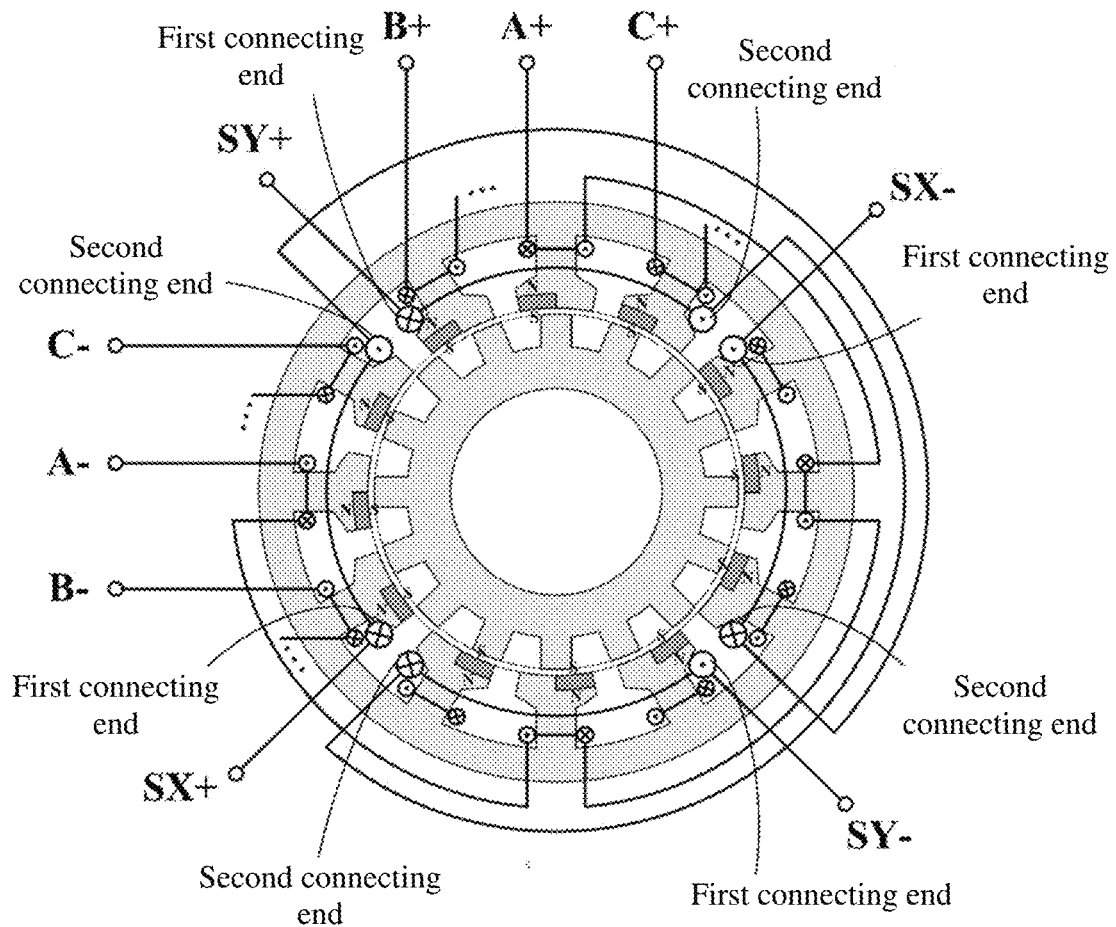
FIG. 5 is a schematic diagram of a connecting end of a suspension coil of a consequent-pole permanent magnet biased bearingless doubly-salient motor provided by an embodiment of the present invention.

In the embodiment, as shown in FIG. 5, each set of suspension coil is provided with two connecting ends in total that are respectively a first connecting end and a second connecting end.

Two sets of suspension coils opposite spatially and radially belong to the same group, the number of groups of suspension coils is two in total, and the two groups are respectively the first suspension winding (5) and the second suspension winding (6). A first connecting end of a first set of suspension coil in the first suspension winding (5) serves as a first wire outgoing end (SX+) of the first suspension winding (5), a second connecting end of the first set of suspension coil in the first suspension winding (5) is connected to a second connecting end of a second set of suspension coil in the first suspension winding (5), and a first connecting end of the second set of suspension coil in the first suspension winding (5) serves as a second wire outgoing end (SX−) of the first suspension winding (5).

The second suspension winding (6) and a first wire outgoing end (SY+) and a second wire outgoing end (SY−)

of the second suspension winding (6) are formed in a manner same as the first suspension winding (5).

The wire outgoing end of the first suspension winding (5) and the wire outgoing end of the second suspension winding (6) are respectively connected to an external first suspension control circuit (9) and second suspension control circuit (10).

Specifically:

Each stator pole 1-1 is wounded with an armature coil, and the armature coils are serially connected in sequence according to the connection shown in FIG. 1 to form the armature winding 4. Every three stator poles 1-1 are wounded with a suspension coil, and each set of suspension coil uses the same winding manner. As shown in FIG. 5, two connecting ends are provided in total and are respectively the first connecting end and the second connecting end; two sets of suspension coils opposite spatially and radially belong to the same group; the first connecting end of the first set of suspension coil in the first group serves as the first wire outgoing end SX+ of the first suspension winding; the second connecting end of the first set of suspension coil in one group of suspension coils is connected to the second connecting end of the second set of suspension coil in the other group of suspension coils, and the first connecting end of the second set of suspension coil in the other group of suspension coils serves as the second wire outgoing end SX− of the first suspension winding; the suspension winding formed by serially connecting the suspension coils in the first group is called the first suspension winding 5; and according to the same manner, the second suspension winding 6 is formed, and the first wire outgoing end SY+ and the second wire outgoing end SY− of the second suspension winding are correspondingly formed. In the consequent-pole permanent magnet biased bearingless doubly-salient motor, each phase of armature winding 4 is distributed evenly, such that each phase of counter potential is symmetric, the heating of the winding is balanced, the heating of the power elements of the external main circuit connected to the armature winding 4 of the motor is balanced, and the current stress is balanced, and thus the motor and the system thereof have high reliability.

The wire outgoing end of the first suspension winding 5 and the wire outgoing end of the second suspension winding 6 are respectively connected to an external first suspension control circuit and second suspension control circuit.

Figure 2:
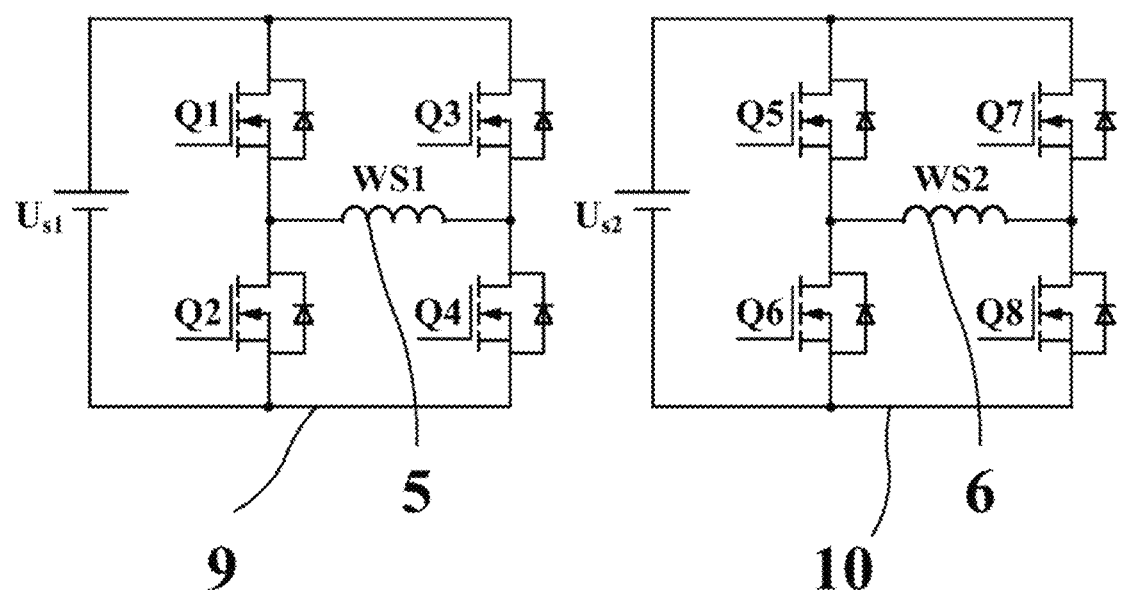
FIG. 2 is a schematic diagram of a first suspension control circuit and a second suspension control circuit of a consequent-pole permanent magnet biased bearingless doubly-salient motor provided by an embodiment of the present invention.

In the embodiment, both the first suspension control circuit and the second suspension control circuit are full-bridge inversion circuits. Specifically for example, as shown in FIG. 2, the first suspension control circuit: a Metal-Oxide-Semiconductor Field Effect Transistor (MOSFET) switch tube $Q_1$ is serially connected to an MOSFET switch tube $Q_2$, an MOSFET switch tube $Q_3$ is serially connected to an MOSFET switch tube $Q_4$, a drain of each of the MOSFET switch tube $Q_1$ and the MOSFET switch tube $Q_3$ is connected to a positive electrode of a direct-current voltage source $U_{S1}$, a source of each of the MOSFET switch tube $Q_2$ and the MOSFET switch tube $Q_4$ is connected to a negative electrode of the direct-current voltage source $U_{S1}$, and two ends of the first suspension winding WS1 are respectively connected to a source of each of the MOSFET switch tube $Q_1$ and the MOSFET switch tube $Q_3$.

The second suspension control circuit: an MOSFET switch tube $Q_5$ is serially connected to an MOSFET switch tube $Q_6$, an MOSFET switch tube $Q_7$ is serially connected to an MOSFET switch tube $Q_8$, a drain of each of the MOSFET switch tube $Q_5$ and the MOSFET switch tube $Q_7$ is connected to a positive electrode of a direct-current voltage source $U_{S2}$, a source of each of the MOSFET switch tube $Q_6$ and the MOSFET switch tube $Q_8$ is connected to a negative electrode of the direct-current voltage source $U_{S2}$, and two ends of the second suspension winding WS2 are respectively connected to a source of each of the MOSFET switch tube $Q_5$ and the MOSFET switch tube $Q_7$.

Figure 3:
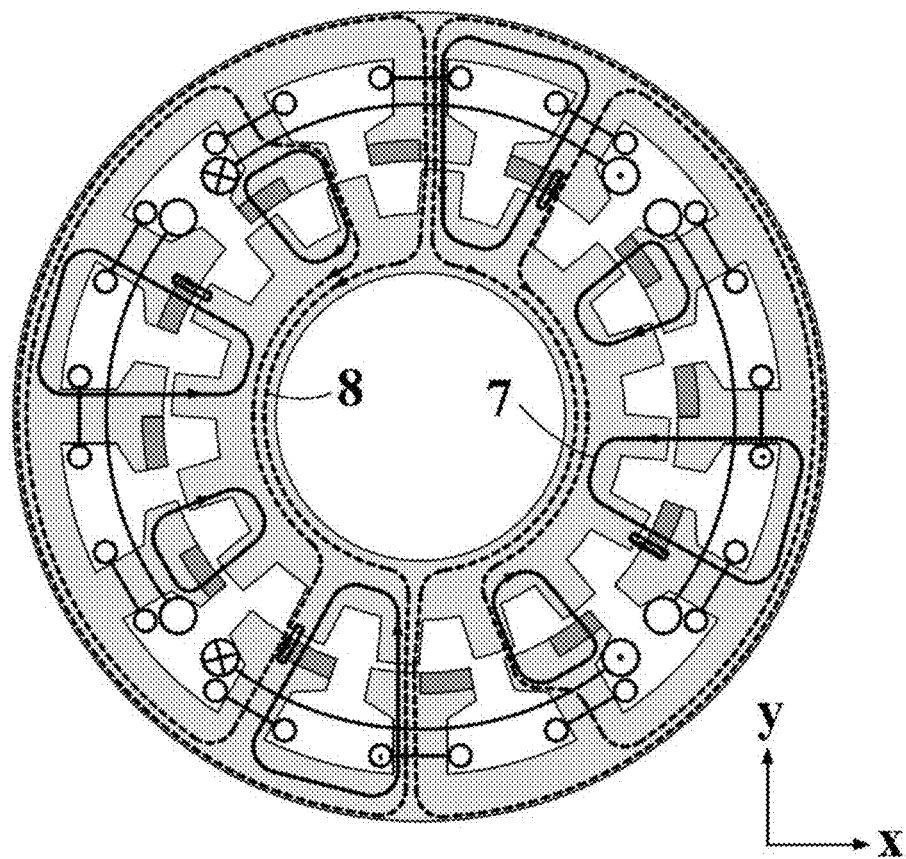
FIG. 3 is a schematic diagram of a magnetic line distribution of a consequent-pole permanent magnet biased bearingless doubly-salient motor at 5° of a rotor provided by an embodiment of the present invention.

With the case where the rotor of the motor shown in FIG. 3 is 5° as an example, there is a distribution schematic diagram of the permanent magnetic line 7 and the suspension magnetic line 8. The current direction in the second suspension winding is as shown in FIG. 3. After the second suspension winding is powered on, the suspension flux generated at an upper air gap is the same as the permanent magnetic flux in direction while the suspension flux generated at a lower air gap is reverse to the permanent magnetic flux in direction, which results in that air-gap magnetic fields are unequal in a y-axis direction. According to a distribution of the air-gap magnetic fields at this moment, the air-gap magnetic field on an upper side of the rotor is stronger than that on a lower side, so the suspension force in the y-axis direction is stressed on the rotor. When the second suspension current increases, the suspension force stressed on the rotor in the y-axis direction increases; and when the second suspension current is reversed, the suspension force stressed on the rotor in the y-axis direction is reversed. Likewise, by controlling the magnitude and direction of the first suspension current, the magnitude and direction of the suspension force of the rotor in the x-axis direction may be controlled. Thus, by controlling the magnitude and direction of the current in the suspension winding, the magnitude and direction of the generated suspension force may be controlled, and thus the rotor is suspended stably.

Optionally, the rotor core 2 in the embodiment may be located inside the stator core 1, or outside the stator core 1.

In the embodiment, the core of the stator/rotor is of the doubly-salient structure, the middle part of the surface, facing the air gap (11), of each stator pole 1-1 is grooved to the edge part of the stator pole 1-1 in the anti-clockwise direction, one permanent magnet 3 is attached in the groove, and the surface, facing the air gap (11), of each permanent magnet 3 is the same in polarity; each stator pole 1-1 is wound with the armature coil, the armature coils are serially connected in sequence to form the armature winding 4, and the armature winding 4 is respectively connected to the external main circuit; and with the use of the stator core 1 consequent-pole permanent magnet for excitation, the usage of the permanent magnet 3 can be reduced, the heating loss can be reduced, and the operation efficiency can be improved.

Thus, the embodiment has the following beneficial effects: as the consequent-pole permanent magnet biased bearingless doubly-salient motor uses the permanent magnet for excitation and is simultaneously used as the bias magnetic field, the electric excitation winding is no longer relied on for excitation, the efficiency is improved, and the loss and heating are reduced.

As the surface, facing the air gap (11), of the stator pole 1-1 uses a consequent-pole permanent magnet structure, the usage of the permanent magnet 3 is reduced; the surface, not provided with the permanent magnet 3 and facing the air gap (11), of the stator pole 1-1 has a small surface reluctance and is used as the suspension flux path, such that the suspension adjustment efficiency is high; and as the suspension flux does not pass through the permanent magnet 3, the demagnetization risk of the permanent magnet 3 is avoided.

As the detecting of the position angle of the rotor is unnecessary in the suspension control link, the suspension system is simpler and more reliable.

Based on the above consequent-pole permanent magnet biased bearingless doubly-salient motor, the embodiments of the present invention further provide a control method of the consequent-pole permanent magnet biased bearingless doubly-salient motor, which includes the following steps.

A radial displacement sensor mounted on an end cover of the motor in an x-axis direction detects a radial position of a rotor of the motor to obtain an actual displacement of the rotor in the x-axis direction.

A radial displacement sensor mounted on the end cover of the motor in a y-axis direction detects a radial position of the rotor of the motor to obtain an actual displacement of the rotor in the y-axis direction, the x axis and the y axis being orthogonal to each other.

A current detection unit respectively detects a current feedback value of a first suspension winding (5) of the motor and a current feedback value of a second suspension winding (6).

A difference value between a preset reference displacement of the motor in the x-axis direction and the actual displacement of the rotor in the x-axis direction is subjected to an x-axis displacement adjustment link to obtain a current reference value of the first suspension winding (5).

A difference value between a preset reference displacement of the motor in the y-axis direction and the actual displacement of the rotor in the y-axis direction is subjected to a y-axis displacement adjustment link to obtain a current reference value of the second suspension winding (6).

A difference value between the current reference value of the first suspension winding (5) and the current feedback value of the first suspension winding (5) is subjected to a first suspension current adjustment link to obtain a duty ratio signal of a first suspension control circuit.

A difference value between the current reference value of the second suspension winding (6) and the current feedback value of the second suspension winding (6) is subjected to a second suspension current adjustment link to obtain a duty ratio signal of a second suspension control circuit.

Current of each of the first suspension winding (5) and the second suspension winding (6) is adjusted by adjusting a switch tube duty ratio of each of the first suspension control circuit and the second suspension control circuit. Therefore, the current of the first suspension winding 5 tracks the reference value, and the current of the second suspension winding 6 tracks the reference value, thereby achieving the purpose of controlling the radial suspension force.

The x-axis displacement adjustment link is Proportional-Integral-Derivative (PID) control; the y-axis displacement adjustment link is the PID control; the first suspension current adjustment link is Proportional-Integral (PI) control; and the second suspension current adjustment link is the PI control.

In the embodiment, the torque control link of the control method includes the steps of controlling with sinusoidal current, or controlling with square wave current.

Figure 4:
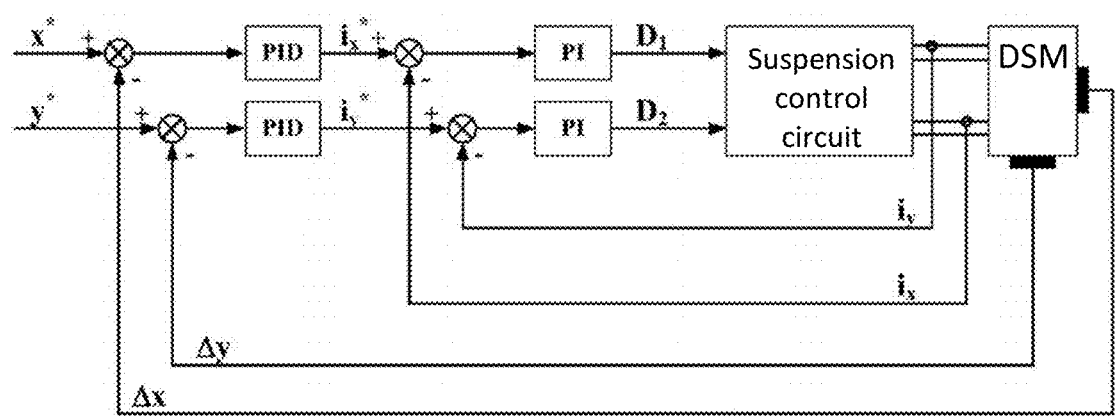
FIG. 4 is a principle block diagram of suspension control of a consequent-pole permanent magnet biased bearingless doubly-salient motor provided by an embodiment of the present invention.

For example, as shown in the principle block diagram of suspension control of the motor in the embodiment in FIG. 4, the radial displacement sensor in the x-axis direction detects the radial position of the rotor of the consequent-pole permanent magnet biased bearingless doubly-salient motor to obtain the actual displacement $\Delta x$ of the rotor in the x-axis direction; the radial displacement sensor in the y-axis direction detects the radial position of the rotor of the consequent-pole permanent magnet biased bearingless doubly-salient motor to obtain the actual displacement $\Delta y$ of the rotor in the y-axis direction, the x axis and the y axis being orthogonal to each other; the current detection unit respectively detects the current feedback value $i_x$ of the first suspension winding of the consequent-pole permanent magnet biased bearingless doubly-salient motor and the current feedback value $i_y$ of the second suspension winding; the difference between the given reference displacement x* of the consequent-pole permanent magnet biased bearingless doubly-salient motor in the x-axis direction and the detected actual displacement $\Delta x$ of the rotor in the x-axis direction is subjected to the x-axis displacement PID adjustment link to obtain the current reference value $i_x$* of the first suspension winding of the consequent-pole permanent magnet biased bearingless doubly-salient motor; the difference between the given reference displacement y* of the consequent-pole permanent magnet biased bearingless doubly-salient motor in the y-axis direction and the detected actual displacement $\Delta y$ of the rotor in the y-axis direction is subjected to the y-axis displacement PID adjustment link to obtain the current reference value $i_y$* of the second suspension winding of the consequent-pole permanent magnet biased bearingless doubly-salient motor; the difference between the current reference value $i_x$* of the first suspension winding of the consequent-pole permanent magnet biased bearingless doubly-salient motor and the current feedback value $i_x$ of the first suspension winding is subjected to the first suspension current PI adjustment link to obtain the duty ratio signal $D_1$ of the first suspension control circuit; the difference between the current reference value $i_y$* of the second suspension winding of the consequent-pole permanent magnet biased bearingless doubly-salient motor and the current feedback value $i_y$ of the second suspension winding is subjected to the second suspension current PI adjustment link to obtain the duty ratio signal $D_2$ of the second suspension control circuit; and the current of each of the first suspension winding and the second suspension winding is adjusted by adjusting the switch tube duty ratio of each of the first suspension control circuit and the second suspension control circuit, such that the current of the first suspension winding tracks the reference value, and the current of the second suspension winding tracks the reference value, thereby achieving the purpose of controlling the radial suspension force. The torque is controlled with the sinusoidal current or the square wave current.

Each of the embodiments in the specification is described in a progressive manner, the same or similar parts among the various embodiments can be referred to one another, and each embodiment focuses on the differences from other embodiments. Particularly, for the device embodiment, it is basically similar with the method embodiment, so the description is simpler, and the related parts can be referred to the description of the method embodiment. The above are only specific embodiments of the present invention, and the scope of protection of the present invention is not limited thereto. Any change or replacement readily conceivable for those skilled in the art in the technical scope of the present invention should be included in the scope of protection of the present invention. Therefore, the scope of protection of the present invention should be subject to the scope of protection of the claims.

What is claimed is:

1. A consequent-pole permanent magnet biased bearingless doubly-salient motor, comprising:
a stator core (1), a rotor core (2), a permanent magnet (3), an armature winding (4) and a suspension winding, the suspension winding comprising: a first suspension winding (5) and a second suspension winding (6), wherein the rotor core (2) is composed of a rotor pole (2-1), and the rotor core (2) is of a salient pole structure;

a stator of the motor is composed of the stator core (1) and the permanent magnet (3), the stator core (1) is composed of a stator pole (1-1), and the stator core (1) is of a salient pole structure;

for each stator pole (1-1):

a middle part of a surface facing an air gap is grooved toward an edge part of the surface facing the air gap in an anti-clockwise direction;

one permanent magnet (3) is attached in a groove of each stator pole (1-1), and a surface, facing the air gap (11), of each permanent magnet (3) is the same in polarity;

each stator pole (1-1) is wound with an armature coil, the armature coils are serially connected in sequence to form the armature winding (4), and the armature winding (4) is connected to an external main circuit; and every three sequentially arranged stator poles form a group and are wounded with a set of suspension coil, and each set of suspension coil uses the same winding direction and winding manner.

2. The consequent-pole permanent magnet biased bearingless doubly-salient motor according to claim 1, wherein each set of suspension coil has two connecting ends in total that are respectively a first connecting end and a second connecting end;

two sets of suspension coils opposite spatially and radially belong to the same group, the number of groups of suspension coils is two in total, and the two groups are respectively the first suspension winding (5) and the second suspension winding (6), wherein a first connecting end of a first set of suspension coil in the first suspension winding (5) serves as a first wire outgoing end (SX+) of the first suspension winding (5), and a second connecting end of the first set of suspension coil in the first suspension winding (5) is connected to a second connecting end of a second set of suspension coil in the first suspension winding (5); and a first connecting end of the second set of suspension coil in the first suspension winding (5) serves as a second wire outgoing end (SX−) of the first suspension winding (5);

the second suspension winding (6) and a first wire outgoing end (SY+) and a second wire outgoing end (SY−) of the second suspension winding (6) are formed in a manner same as the first suspension winding (5); and the wire outgoing end of the first suspension winding (5) and the wire outgoing end of the second suspension winding (6) are respectively connected to an external first suspension control circuit (9) and second suspension control circuit (10).

3. The consequent-pole permanent magnet biased bearingless doubly-salient motor according to claim 1, wherein the number of stator poles (1-1) is 12n, and the number of rotor poles (2-1) is 16n, the n being a positive integer.

4. The consequent-pole permanent magnet biased bearingless doubly-salient motor according to claim 1, wherein the rotor core (2) is located inside the stator core (1).

5. The consequent-pole permanent magnet biased bearingless doubly-salient motor according to claim 1, wherein the rotor core (2) is located outside the stator core (1).

6. The consequent-pole permanent magnet biased bearingless doubly-salient motor according to claim 1, wherein both the first suspension control circuit and the second suspension control circuit are full-bridge inversion circuits.

7. The consequent-pole permanent magnet biased bearingless doubly-salient motor according to claim 1, wherein the external main circuit is a full-bridge inversion circuit.

8. A control method of a consequent-pole permanent magnet biased bearingless doubly-salient motor, comprising a suspension control link and a torque control link, wherein the suspension control link of the control method comprises:

detecting, by a radial displacement sensor mounted on an end cover of the motor in an x-axis direction, a radial position of a rotor of the motor to obtain an actual displacement of the rotor in the x-axis direction;

detecting, by a radial displacement sensor mounted on the end cover of the motor in a y-axis direction, a radial position of the rotor of the motor to obtain an actual displacement of the rotor in the y-axis direction, the x axis and the y axis being orthogonal to each other;

respectively detecting, by a current detection unit, a current feedback value of a first suspension winding (5) of the motor and a current feedback value of a second suspension winding (6);

subjecting a difference value between a preset reference displacement of the motor in the x-axis direction and the actual displacement of the rotor in the x-axis direction to an x-axis displacement adjustment link to obtain a current reference value of the first suspension winding (5);

subjecting a difference value between a preset reference displacement of the motor in the y-axis direction and the actual displacement of the rotor in the y-axis direction to a y-axis displacement adjustment link to obtain a current reference value of the second suspension winding (6);

subjecting a difference value between the current reference value of the first suspension winding (5) and the current feedback value of the first suspension winding (5) to a first suspension current adjustment link to obtain a duty ratio signal of a first suspension control circuit;

subjecting a difference value between the current reference value of the second suspension winding (6) and the current feedback value of the second suspension winding (6) to a second suspension current adjustment link to obtain a duty ratio signal of a second suspension control circuit; and adjusting current of each of the first suspension winding (5) and the second suspension winding (6) by adjusting a switch tube duty ratio of each of the first suspension control circuit and the second suspension control circuit.

9. The control method according to claim 8, wherein the x-axis displacement adjustment link is Proportional-Integral-Derivative (PID) control;

the y-axis displacement adjustment link is the PID control;

the first suspension current adjustment link is Proportional-Integral (PI) control; and the second suspension current adjustment link is the PI control.

10. The control method according to claim 8, wherein the torque control link of the control method comprises:

controlling with sinusoidal current, or controlling with square wave current.

* * * * *